(12) United States Patent
Fowler

(10) Patent No.: US 12,135,100 B2
(45) Date of Patent: Nov. 5, 2024

(54) DIAPHRAGM VALVE FORMED USING ADDITIVE MANUFACTURE

(71) Applicant: Neptune Technology Group Inc., Tallassee, AL (US)

(72) Inventor: Jeffrey M. Fowler, Lawrenceville, GA (US)

(73) Assignee: Neptune Technology Group Inc., Tallassee, AL (US)

( * ) Notice: Subject to any disclaimer, the term of this patent is extended or adjusted under 35 U.S.C. 154(b) by 421 days.

(21) Appl. No.: 17/673,121

(22) Filed: Feb. 16, 2022

(65) Prior Publication Data

US 2022/0282794 A1    Sep. 8, 2022

Related U.S. Application Data

(60) Provisional application No. 63/155,932, filed on Mar. 3, 2021.

(51) Int. Cl.
*F16K 7/17* (2006.01)
*B33Y 80/00* (2015.01)
*F16K 17/18* (2006.01)
*F16K 27/02* (2006.01)
*F16K 31/126* (2006.01)
(Continued)

(52) U.S. Cl.
CPC ............... *F16K 7/17* (2013.01); *F16K 17/18* (2013.01); *F16K 27/0236* (2013.01); *F16K 31/1262* (2013.01); *F16K 31/365* (2013.01); *F16K 31/385* (2013.01); *F16K 39/02* (2013.01); *H02J 50/001* (2020.01); *H02J 50/10* (2016.02); *B33Y 80/00* (2014.12); *F16K 2200/40* (2021.08); *Y10T 137/7764* (2015.04); *Y10T 137/7769* (2015.04); *Y10T 137/777* (2015.04); *Y10T 137/7836* (2015.04)

(58) Field of Classification Search
CPC ...... F16K 7/17; F16K 31/1262; F16K 31/365; F16K 31/385; F16K 2200/40; F16K 27/0236; F16K 17/18; F16K 39/02; Y10T 137/7836; Y10T 137/7764; Y10T 137/7769; Y10T 137/777; H02J 50/001; H02J 50/10; H02J 7/32
USPC ............ 137/510, 489, 490, 491, 492, 492.5; 251/30.01–30.5, 33–38, 43–46, 113
See application file for complete search history.

(56) References Cited

U.S. PATENT DOCUMENTS

| 258,432 A | * | 5/1882 | Keith ......................... F16K 1/20 251/303 |
| 1,059,037 A | * | 4/1913 | Collar ....................... F16K 1/20 251/44 |

(Continued)

*Primary Examiner* — William M McCalister
(74) *Attorney, Agent, or Firm* — Snyder, Clark, Lesch & Chung, LLP

(57) ABSTRACT

An oscillating diaphragm valve is provided. The valve is configured such that, when the diaphragm is in a closed position, pressure of a fluid supply opens the valve, and when the diaphragm is in an open position, the pressure of the fluid closes the valve. The valve internals are formed as a single, enclosed piece, with openings provided only for supply and consumption. The pilot-operated diaphragm-type valve uses a return spring for the diaphragm that applies a biasing force to an outside surface of the valve internals. Additionally, an actuator is provided to selectively arrest the diaphragm in an open or closed position by applying force to a different outside surface of the valve internals.

20 Claims, 5 Drawing Sheets

(51) Int. Cl.
  *F16K 31/365* (2006.01)
  *F16K 31/385* (2006.01)
  *F16K 39/02* (2006.01)
  *H02J 50/00* (2016.01)
  *H02J 50/10* (2016.01)

(56) References Cited

U.S. PATENT DOCUMENTS

| | | | | |
|---|---|---|---|---|
| 1,128,228 A * | 2/1915 | Collar | F15B 13/0405 | 251/35 |
| 1,722,666 A * | 7/1929 | Keith | G05D 16/163 | 251/38 |
| 2,280,615 A * | 4/1942 | Baldwin | B60T 15/048 | 251/114 |
| 2,283,513 A * | 5/1942 | Smith | B21D 51/34 | 126/362.1 |
| 2,350,202 A * | 5/1944 | Thomas | F28G 1/166 | 165/95 |
| 2,377,227 A * | 5/1945 | Griswold | F16K 31/385 | 137/489.5 |
| 3,008,683 A * | 11/1961 | Filliung | E03D 3/04 | 251/30.03 |
| 3,291,439 A * | 12/1966 | Goldstein | E03D 3/06 | 251/100 |
| 3,348,538 A * | 10/1967 | Benzel | A62B 9/02 | 128/204.26 |
| 3,380,469 A * | 4/1968 | Salerno | B64D 13/06 | 251/44 |
| 3,399,689 A * | 9/1968 | Keane | F16K 31/42 | 137/220 |
| 3,415,269 A * | 12/1968 | Salerno | F16K 31/42 | 251/35 |
| 3,476,353 A * | 11/1969 | Stampfli | F16K 31/402 | 251/30.02 |
| 3,561,468 A | 2/1971 | Sugden, Jr. | | |
| 3,566,907 A * | 3/1971 | Sime | F16K 37/0008 | 137/553 |
| 3,568,706 A * | 3/1971 | Weise | F16K 17/105 | 137/112 |
| 3,633,601 A * | 1/1972 | Vez | A61M 16/00 | 137/81.2 |
| 3,788,400 A * | 1/1974 | Tufts | A62C 35/645 | 251/44 |
| 3,851,851 A | 12/1974 | Ginder, Jr. | | |
| 3,977,423 A * | 8/1976 | Clayton | G05D 16/166 | 137/487 |
| 4,026,327 A * | 5/1977 | Deinlein-Kalb | F01D 17/145 | 137/219 |
| 4,108,419 A | 8/1978 | Sturman et al. | | |
| 4,185,772 A * | 1/1980 | Brakebill | G05D 23/185 | 236/92 R |
| 4,450,863 A * | 5/1984 | Brown | F16K 31/404 | 251/38 |
| 4,477,051 A * | 10/1984 | Ben-Yehuda | F16K 31/145 | 251/30.01 |
| 4,693,242 A * | 9/1987 | Biard | A62B 9/025 | 251/149.6 |
| 4,699,351 A * | 10/1987 | Wells | F16K 31/408 | 251/38 |
| 4,817,821 A * | 4/1989 | Simoens | B65D 88/703 | 222/3 |
| 4,893,645 A * | 1/1990 | Augustinas | F16K 31/402 | 251/285 |
| 5,069,242 A | 12/1991 | Kilgore | | |
| 5,169,117 A * | 12/1992 | Huang | F16K 31/086 | 251/38 |
| 5,299,774 A * | 4/1994 | Arneson | F16K 24/02 | 251/30.02 |
| 5,299,775 A * | 4/1994 | Kolze | G05D 16/2095 | 251/38 |
| 5,431,181 A * | 7/1995 | Saadi | E03D 5/10 | 137/315.07 |
| 5,632,465 A * | 5/1997 | Cordua | F16K 31/402 | 251/30.02 |
| 5,732,929 A * | 3/1998 | Luppino | F16K 31/404 | 251/38 |
| 5,771,921 A * | 6/1998 | Johnson | F16K 21/18 | 251/297 |
| 5,842,501 A * | 12/1998 | Powell | F16K 31/383 | 137/489 |
| 5,967,176 A * | 10/1999 | Blann | F16K 31/365 | 137/489.5 |
| 5,979,482 A * | 11/1999 | Scott | F16K 31/402 | 137/15.01 |
| 6,161,570 A * | 12/2000 | McNeely | G05D 16/166 | 137/491 |
| 6,263,901 B1 * | 7/2001 | Lohde | F16K 31/402 | 251/30.02 |
| 6,298,872 B1 | 10/2001 | Keller | | |
| 6,318,406 B1 * | 11/2001 | Conley | F16K 17/10 | 251/38 |
| 6,394,412 B2 * | 5/2002 | Zakai | F16K 31/402 | 251/30.02 |
| 6,536,533 B2 * | 3/2003 | Reilly | A62C 35/62 | 169/17 |
| 6,708,771 B2 * | 3/2004 | Reilly | A62C 37/44 | 169/44 |
| 6,986,360 B2 | 1/2006 | Chaffee | | |
| 7,690,622 B2 | 4/2010 | Ito et al. | | |
| 8,550,101 B2 * | 10/2013 | Folk | F16K 31/1262 | 251/35 |
| 8,596,606 B2 * | 12/2013 | Maercovich | E03C 1/055 | 251/38 |
| 8,739,829 B2 * | 6/2014 | Maercovich | F16K 31/05 | 251/30.01 |
| 9,169,944 B1 | 10/2015 | Dunn et al. | | |
| 9,297,465 B2 * | 3/2016 | Mevius | G05D 16/0694 | |
| 9,309,992 B2 * | 4/2016 | Bush | E03D 1/34 | |
| 10,012,384 B2 | 7/2018 | Prichard et al. | | |
| 10,281,053 B2 | 5/2019 | Griffin, Jr. et al. | | |
| 10,443,630 B2 | 10/2019 | Collins | | |
| 10,487,486 B2 * | 11/2019 | Funari | E03D 5/105 | |
| 10,578,228 B2 * | 3/2020 | Block | F16K 37/0058 | |
| D883,444 S * | 5/2020 | Block | D23/249 | |
| 10,753,075 B2 * | 8/2020 | Funari | F16K 5/0407 | |
| 11,079,037 B2 * | 8/2021 | Kunau | F16K 31/383 | |
| 2002/0046774 A1 | 4/2002 | Keller | | |
| 2015/0316345 A1 * | 11/2015 | Brahler, II | F41B 11/60 | 124/73 |
| 2016/0040798 A1 * | 2/2016 | Kunau | F16K 15/20 | 137/12 |

* cited by examiner

DIAPHRAGM VALVE FORMED USING ADDITIVE MANUFACTURE

CROSS-REFERENCE TO RELATE APPLICATION

This application claims priority under 35 U.S.C. § 119 to U.S. Provisional Patent Application No. 63/155,932 filed Mar. 3, 2021, entitled "Diaphragm Valve Formed Using Additive Manufacture," the disclosure of which is hereby incorporated by reference.

BACKGROUND OF THE INVENTION

Diaphragm valves may be used for multiple purposes, including providing low-power actuation of remotely operated valves.

A diaphragm valve is typically manufactured by installing various components inside a two-part housing. These internal components typically include a diaphragm and a spring. The two-part housing is secured (e.g., welded or bolted together) over the internal components. This method requires a plurality of parts and a plurality of assembly steps, each with opportunities for defects or improper assembly. Further, the joining of the two parts of the housing may result in leaks.

DETAILED DESCRIPTION OF THE PREFERRED EMBODIMENTS

The following detailed description refers to the accompanying drawings. The same reference numbers in different drawings identify the same or similar elements. Also, the following detailed description does not limit the invention.

According to implementations described herein, a diaphragm-type valve, such as a pilot-operated diaphragm-type valve, is provided. The valve may be configured such that when the diaphragm is in a closed position, pressure of a fluid supply opens the valve, and when the diaphragm is in an open position, the pressure of the fluid closes the valve. The valve internals may be formed as an enclosed unitary piece, with openings provided for supply (inlet) and consumption (outlet). According to one implementation, the pilot-operated diaphragm-type valve may comprise a return spring for the diaphragm that is applied to an outside surface of the valve internals. Additionally, in another implementation, an actuator is provided to selectively arrest the diaphragm by applying force to a different outside surface of the valve internals.

Various elastomeric materials are available for additive manufacturing (e.g., three-dimensional (3D) printing). According to implementations described herein, by varying the thickness and/or material composition of internal features, the internal valve housing, together with features typically provided by internal components, can be manufactured in a single additive manufacturing process. The resulting diaphragm valve may provide a water-tight part with fewer opportunities for defects or improper assembly.

Figure 1A:
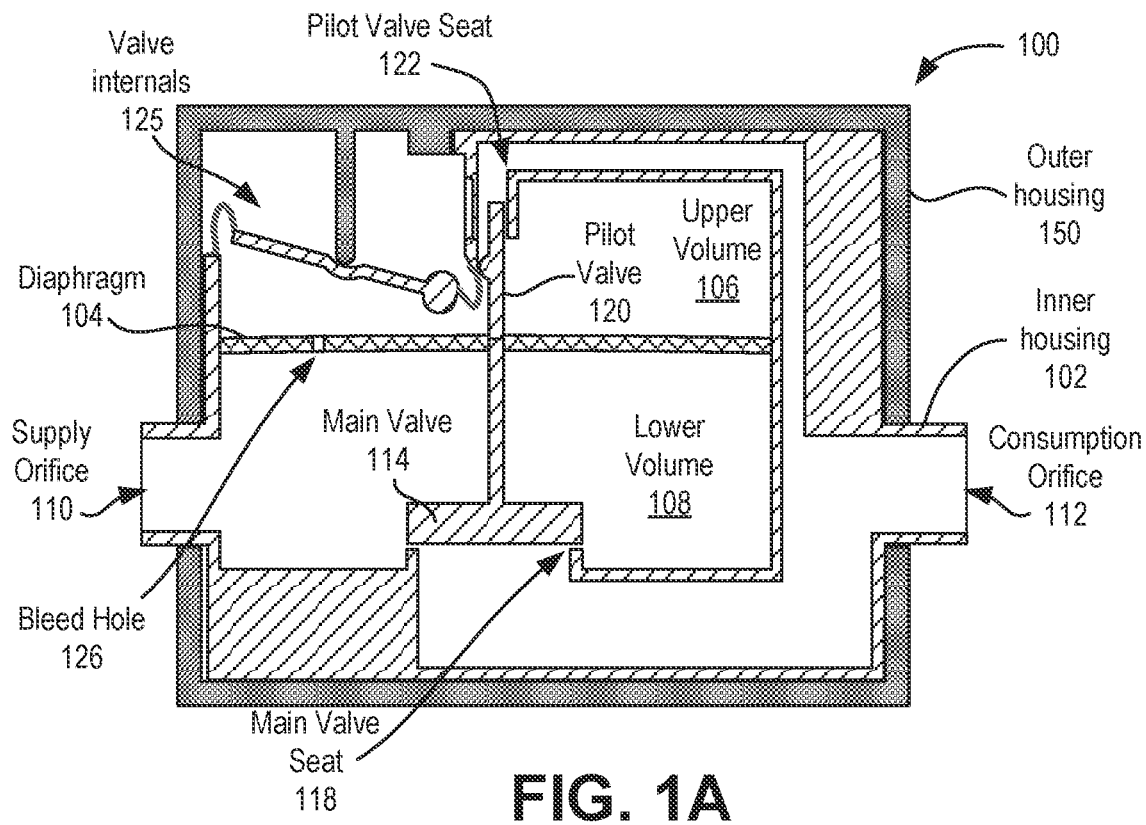
FIG. 1A is a schematic cross-sectional diagram illustrating an oscillating valve according to a first embodiment described herein.
Figure 1B:
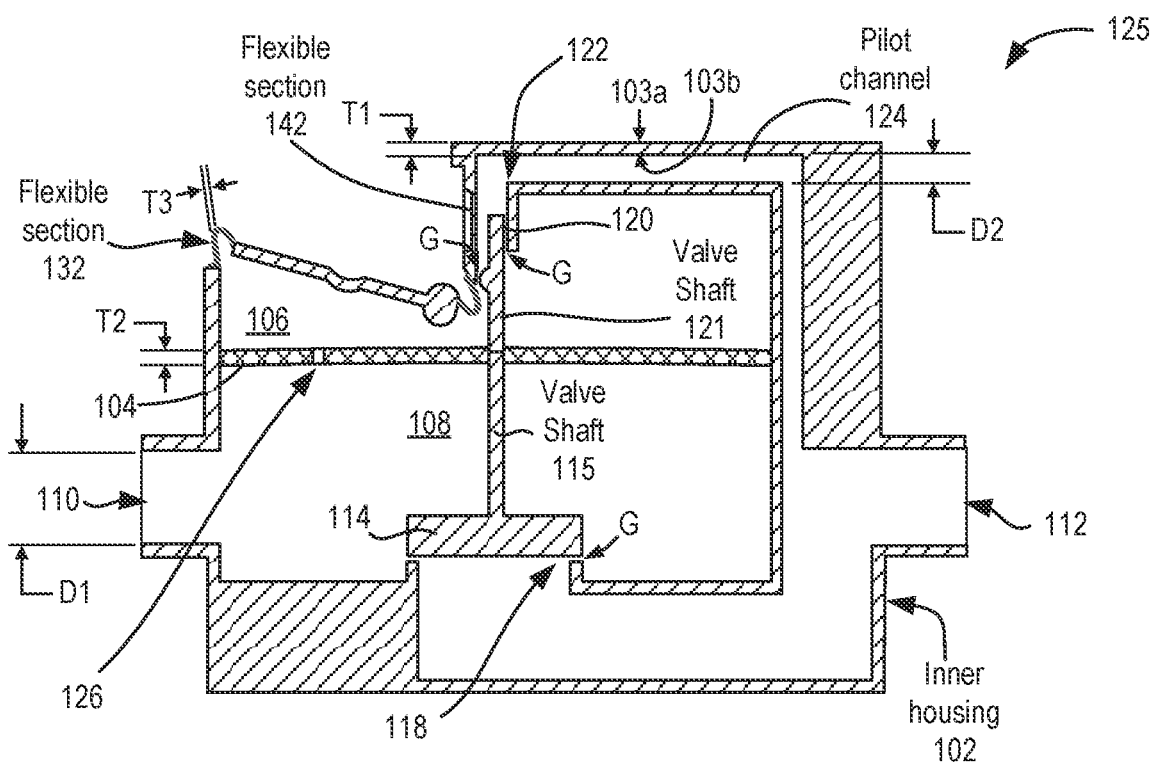
FIG. 1B illustrates the valve internals of the oscillating valve of FIG. 1A.

FIG. 1A is a schematic side cross-sectional view illustrating a diaphragm valve 100 according to an embodiment described herein. Diaphragm valve 100 (and other valve embodiments describe herein) may also be referred to as a valve system. Diaphragm valve 100 may include valve internals 125 and an outer housing 150. FIG. 1B is a schematic diagram illustrating valve internals 125 without outer housing 150.

Referring collectively to FIGS. 1A and 1B, valve internals 125 may include an inner housing 102, which may be divided internally by a diaphragm 104 into an upper volume 106 (also referred to herein as a first volume) and a lower volume 108 (also referred to herein as a second volume). Inner housing 102 may also include a supply orifice 110 and a consumption orifice 112. Supply orifice 110 may typically receive a constant fluid supply from, for example, a public or private water system. Demand through consumption orifice 112 may be governed by, for example, water usage at a customer site that is connected to valve 100. Outer housing 150 may be generally configured to encase valve internals 125 without limiting access to supply orifice 110 and consumption orifice 112. According to an implementation, outer housing 150 may include connections (not shown) to direct fluid into supply orifice 110 and out from consumption orifice 112.

Supply orifice 110 may feed fluid into lower volume 108, and consumption orifice 112 may expel fluid from lower volume 108. The terms "lower" and "upper" as used herein are for purposes of illustration, and oscillating valve 100 is not limited by a particular orientation of upper volume 106 and lower volume 108. A pilot (or bypass) channel 124 connects upper volume 106 to consumption orifice 112. As illustrated in FIG. 1B, pilot channel 124 includes a smaller inner diameter (D2) than an inner diameter (D1) of the supply orifice 110. Diaphragm 104 may include one or more bleed holes 126 to permit a limited transfer rate of fluid between lower volume 108 and upper volume 106.

A main valve 114 is connected to diaphragm 104 and positioned within the lower volume 108 between supply orifice 110 and consumption orifice 112. For example, main valve 114 may be connected (or coupled) to diaphragm 104 via a valve shaft 115. Similarly, a pilot valve 120 is connected to diaphragm 104 and positioned within the upper volume 106. For example, pilot valve 120 may be connected (or coupled) to diaphragm 104 via a valve shaft 121. Thus, movement (e.g. upward or downward movement) of diaphragm 104 correspondingly causes valve shaft 115/121 to move in the same direction. Valve shafts 115/121 are shown for clarity. In other implementations, features of valve shafts 115/121 may be integrated into diaphragm 104, without including valve shafts 115 and/or 121.

Inner housing 102 may be formed from an elastomeric polymer, for example, with a sufficient thickness to resist deformation at pressures in upper volume 106 and lower volume 108. In one implementation, inner housing 102 may generally have the shape of an enclosed cylinder with an axis generally parallel to valve shafts 115/121. Portions of inner housing 102 may have portions with different wall thicknesses, such as flexible wall section 132 and flexible wall section 142 described further below, to permit for selective deformation. Diaphragm 104 may be formed using a same or different material as inner housing 102. In one implementation, diaphragm 104 may be more flexible than inner housing 102 to permit deformation of diaphragm 104, as described herein.

Inner housing 102 may be formed from an elastomeric polymer, for example, with a sufficient thickness to resist deformation at pressures in upper volume 106 and lower volume 108. In one implementation, inner housing 102 may generally have the shape of an enclosed cylinder with an axis generally parallel to valve shafts 115/121. For purposes of description, inner housing 102 may generally be described as having walls 103 with an outside surface 103a and an inside surface 103b. Diaphragm 104 may be integral with or secured to walls of inner housing 102. Diaphragm 104 may be formed using a same or different material than inner housing 102. Diaphragm 104 may be less rigid than valve housing 102 to permit deformation of diaphragm 104, as described herein. For example, diaphragm 104 may have a smaller thickness (T2) than the thickness (T1) of inner housing 102.

As described further herein, inner housing 102 may include one or more flexible wall sections (e.g., flexible wall sections 132/142) that may be less resistant to deformation than other portions of inner housing 102. For example, flexible wall sections 132/142 may have a relatively greater flexibility than adjacent sections of inner housing 102. This greater flexibility may be achieved by using a smaller wall thickness (T3) at flexible wall sections 132/142 than at other portions of inner housing 102 (T1). Flexible wall section 132 and flexible wall section 142 may permit selective deformation from external forces, as described further herein.

Although the thickness T3 of flexible wall sections 132/142 is shown as the same in FIG. 1B, in other implementations, flexible wall section 132 and flexible wall section 142 may have different thickness. Furthermore, thickness T3 (and/or flexural modulus) may be different (e.g., larger) than the thickness T2 (and/or flexural modulus) of diaphragm 104. In other implementations, the relatively greater flexibility of one or more of flexible wall sections 132/142 may be achieved by using a different (i.e., more elastic) material for flexible wall sections 132/142 than in other portions of inner housing 102.

Main valve 114 intermittently engages with a main valve seat 118 to block or permit flow from supply orifice 110 to consumption orifice 112. Pilot valve 120 intermittently engages with a pilot valve seat 122 at the entrance of pilot channel 124 to block or permit flow from upper volume 106 to consumption orifice 112. According to an implementation, diaphragm 104, main valve 114, and main valve seat 118 are axially aligned within housing 102 to optimize axial displacement of main valve 114/diaphragm 104.

Inner housing 102 may be substantially surrounded by outer housing 150 that provides rigidity and supports a pressure of the fluid. As described further herein, outer housing 150 may provide surfaces to mount and locate additional components, such as springs, an actuator, and any components required to control and power the actuator. Outer housing 150 may be cast from a metal such as bronze, or injection molded from a polymer such as polycarbonate. The polymer may be filled with a material to modify its stiffness, such as glass fiber. Outer housing 150 may be configured as a single piece or assembled around inner housing 102 as a multi-piece component. In other implementation, outer housing 150 may be configured as a cage or lattice structure.

Figure 2A:
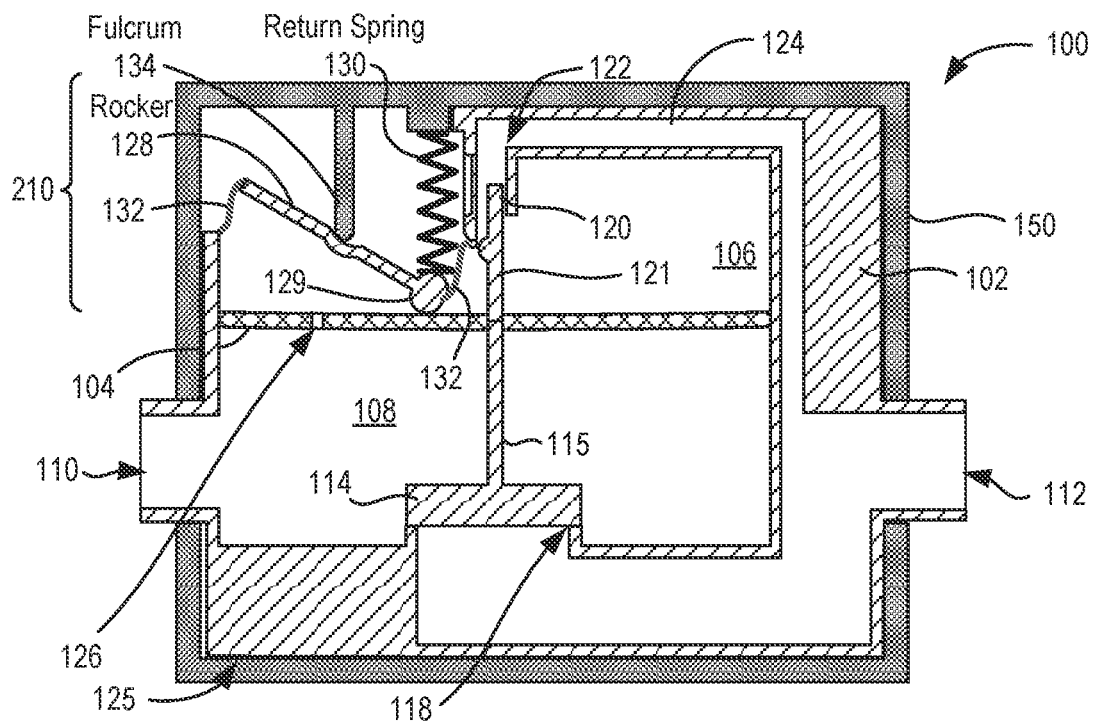
FIG. 2A is a schematic cross-sectional diagram illustrating the oscillating diaphragm valve of FIG. 1A in a closed position.
Figure 2B:
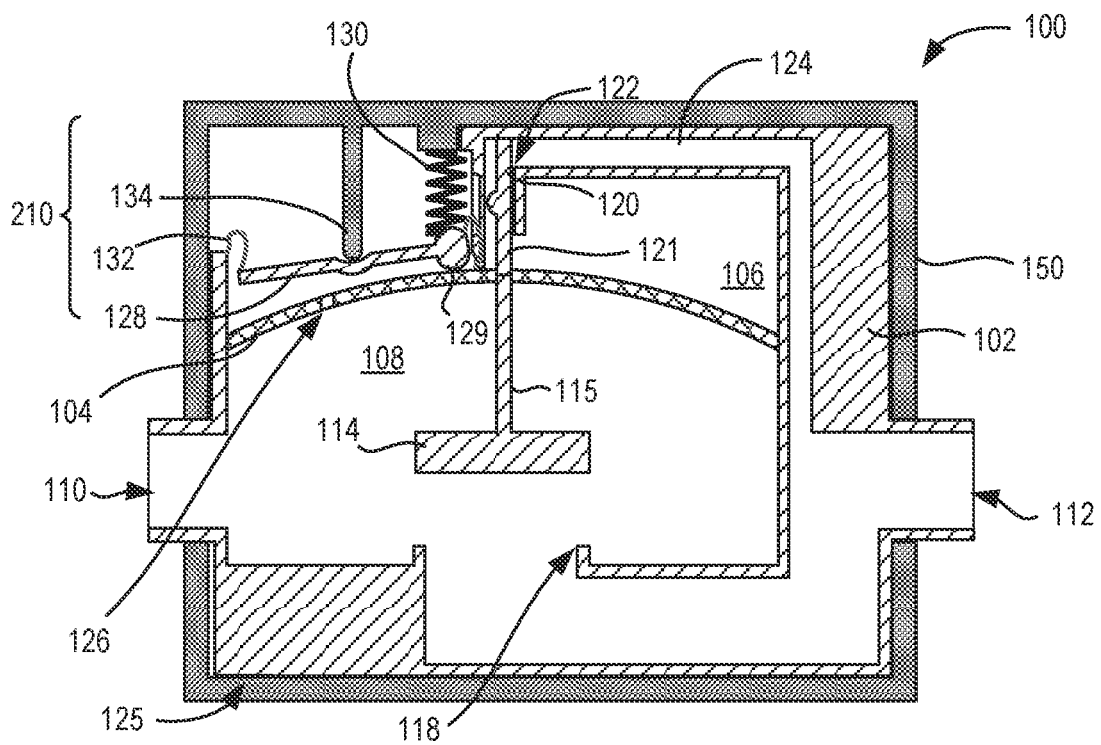
FIG. 2B is a schematic cross-sectional diagram illustrating the oscillating diaphragm valve of FIG. 1A in an open position.

FIGS. 2A and 2B are schematics of valve 100 according to another implementation. In the configuration of FIGS. 2A and 2B, valve internals 125 may include a biasing system 210 to bias diaphragm 104 and main valve 114 toward a closed position. Particularly, in FIGS. 2A and 2B, biasing system 210 may include a rocker portion 128 (also referred to herein simply as rocker 128), a return spring 130, flexible wall section 132, and a fulcrum 134. Rocker 128 may be integral with inner housing 102 and connected to inner housing 102 by flexible wall section 132. Rocker 128 may, for example, include a substantially oval or disc-shaped portion of inner housing 102 surrounded by flexible wall section 132 such that flexible wall section 132 forms a contiguous fluid-tight barrier between inner housing 102 and rocker 128. As described further herein, rocker 128 may pivot around fulcrum 134 to the extent permitted by flexible wall section 132. According to an implementation, return spring 130 may be located outside of inner housing 102 and mounted between an outside surface of rocker 128 (e.g., outside surface 103a) and external housing 150. In the example of FIGS. 2A and 2B, fulcrum 134 may be integral with or connected to outer housing 150 and configured to contact rocker 128 generally at the center of rocker 128. In other implementations, fulcrum 134 may be integral with inner housing 102, for example. Return spring 130 applies a biasing force to one area of rocker 128, which may cause a head portion 129 of rocker 128 to maintain contact with diaphragm 104.

In operation of valve 100, fluid (e.g., water) pressure entering supply orifice 110 typically exceeds pressure exiting consumption office 112. For example, according to one implementation, supply pressure may generally be at least 0.5 atmospheres higher than pressure exiting consumption orifice 112. According to one implementation, pilot valve 120 is actuated by a feature of diaphragm 104, or a part directly or indirectly attached to the diaphragm. Pilot channel 124 may connect consumption orifice 112 to upper volume 106 above diaphragm 104, with an end of the pilot channel situated at pilot valve seat 122 above the center of diaphragm 104 and oriented axially to diaphragm 104, such that pilot channel 124 is blocked by pilot valve 120 when diaphragm 104 is raised and pilot channel 124 is opened (or unblocked) when diaphragm 104 is lowered. According to an implementation, an outlet of pilot channel 124 at pilot valve seat 122 may be oriented perpendicular to the axial motion of diaphragm 104, and a feature of the diaphragm, or a part directly or indirectly attached to the diaphragm (e.g., pilot valve 120), may slide over pilot valve seat 122 at the end of pilot channel 124 when diaphragm 104 is raised, and slide so as to uncover the end of the pilot channel 124 at pilot valve seat 122 when diaphragm 104 is lowered. Alternatively, diaphragm 104, pilot valve 120, and pilot valve seat 122 may be axially aligned within inner housing 102.

Referring collectively to FIGS. 1A-2B, according to implementations described herein, valve internals 125 (including, for example, inner housing 102, diaphragm 104, main valve 114, and pilot valve 120) may be additively manufactured as a unitary component (e.g., a single piece). If diaphragm 104 were to be additively manufactured with main valve 114 in a closed configuration (e.g., FIG. 2A), main valve 114 may become bonded to main valve seat 118. To prevent this, diaphragm 104 may be additively manufactured in an open or partially open configuration, as shown in FIG. 1B, with gaps, G, between main valve 114 and valve seat 118 and between pilot valve 120 and valve seat 122. This manufactured diaphragm position will typically mean that there is inadequate return force in diaphragm 104 to return main valve 114 to a closed position (e.g., FIG. 2A) from the open position (e.g., FIG. 2B). While gravity may be sufficient to return main valve 114 to the closed position, such a design would depend on a particular orientation for proper operation.

Consequently, return spring 130 may be installed exterior to inner housing 102 to apply a return force through rocker 128 of the inner housing 102 such that rocker 128 of inner housing 102 directly or indirectly transmits a return force to diaphragm 104. Return spring 130 may be implemented as a coil spring, a leaf spring, or another type of spring that provides bias against expansion of diaphragm 104 into upper volume 106. According to one implementation, flexible wall section 132 may include a different material flexibly bonded to inner housing 102 and/or rocker 128. According to another implementation, flexible wall section 132 may include the same material used in inner housing 102/rocker 128, but with a different wall thickness (T3).

The arrangement of biasing system 210, as depicted in FIGS. 2A and 2B, may allow movement of rocker 128 in such a way as to maintain a consistent internal volume (or capacity) within inner housing 102 that is not affected by the motion of rocker 128. More particularly, the combined volume of upper volume 106 and lower volume 108 is the same when valve 114 is a closed position (e.g., in FIG. 2A) and open position (e.g., in FIG. 2B). Maintaining a consistent capacity within inner housing 102 prevents motion of rocker 128 from doing appreciable positive or negative work on the water in upper volume 106. In this way, the motion of rocker 128 has no significant direct effect on the pressure in upper volume 106, nor does the pressure in upper volume 106 have a significant direct effect on the motion of rocker 128.

Figure 3A:
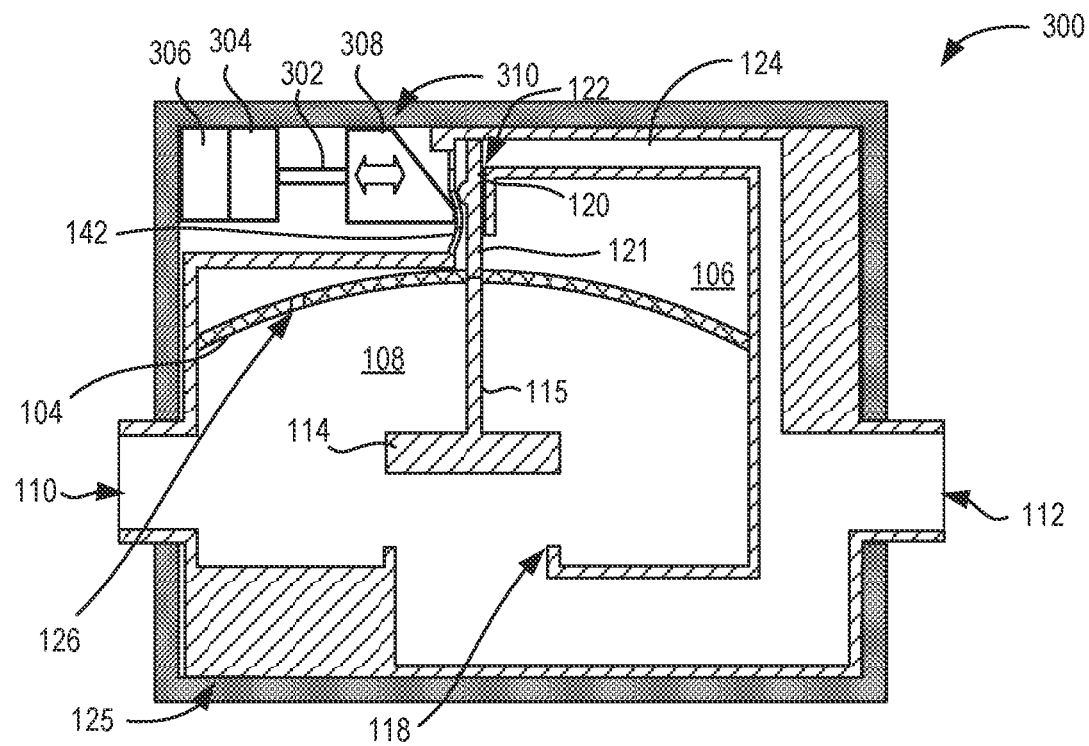
FIG. 3A is a schematic cross-sectional diagram illustrating the oscillating diaphragm valve of FIG. 1A with an actuating system securing the valve in an open position.
Figure 3B:
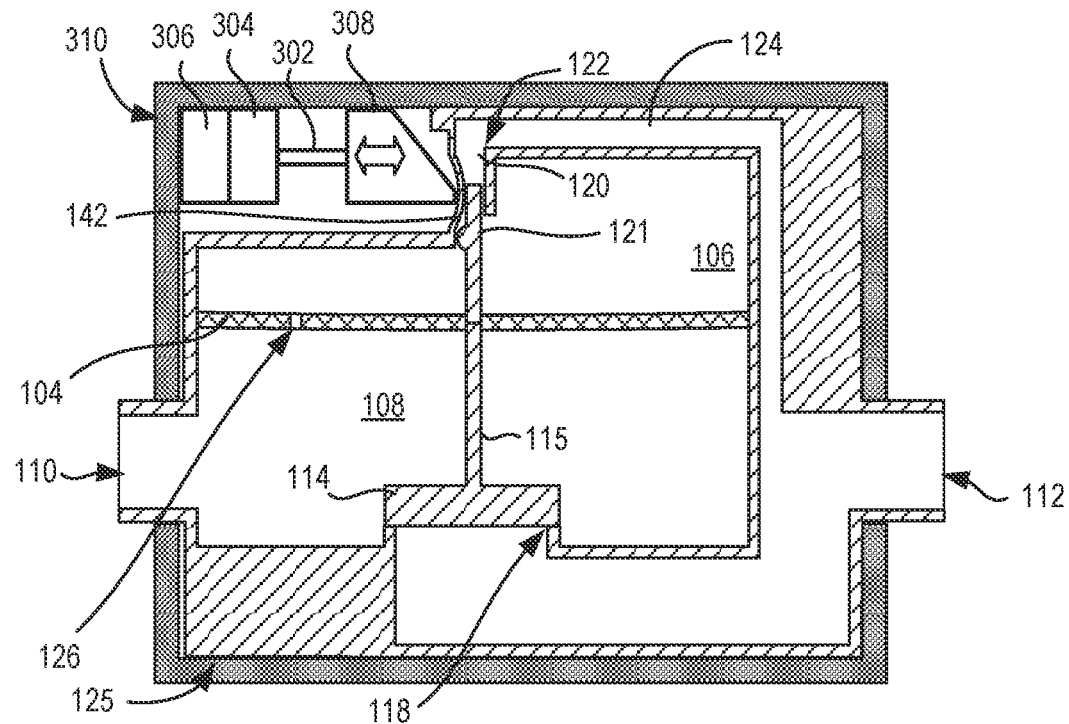
FIG. 3B is a schematic cross-sectional diagram illustrating the oscillating diaphragm valve of FIG. 1B with an actuating system securing the valve in a closed position.

FIGS. 3A and 3B are schematics of valve 100 according to another implementation. In the configuration of FIGS. 3A and 3B, diaphragm 104/main valve 114 may be caused to arrest specifically in an open position or a closed position. Particularly, in FIGS. 3A and 3B, valve 100 includes an armature 302, an actuator 304, a power source 306, and a pin 308. Armature 302, actuator 304, power source 306, and pin 308 may be collectively referred to herein as actuator system 310. In FIGS. 3A and 3B, valve 100 does not show biasing system 210 for simplicity. In other implementations, actuator system 310 and biasing system 210 may be combined in valve 100.

Armature 302 may be connected between actuator 304 and pin 308 to selectively hold main valve 114 in an open or closed position. According to an implementation, actuator system 310 (e.g., armature 302, actuator 304, power source 306, and pin 308) may be located outside of inner housing 102 and mounted to external housing 150. In another implementation, one or more components of actuator system 310 may be located outside of external housing 150 and connected other components of actuator system 310 within external housing 150. Armature 302 may be positioned adjacent to flexible wall section 142. Actuator 304 may be configured to receive signals from a radio frequency meter interface unit (RF MIU) to control the state (e.g., open, closed, neutral, etc.) of valve 100 (or another oscillating valve). For example, an RF MIU (not shown) may provide a signal for actuator 304 to turn on or shut off fluid (e.g., water) to a site serviced through consumption orifice 112. According to another implementation, actuator 304 may be combined with a controller, such as a controller for an RF MIU.

Actuator 304 may be connected to a power source 306, such as a battery. According to an implementation, actuator 304 may include a solenoid, a mechanical latching mechanism, an electrostatic actuator, or another type of actuator. In another implementation, actuator 304 may incorporate a micro latching mechanism. According to an implementation, armature 302 may include a switch to toggle a pin 308 to engage or disengage a feature of valve shaft 121. Actuator 304 may shift armature 302 such that spring-loaded pin 308 contact an outer surface of flexible wall section 142 (e.g., outer surface 103a) to force flexible wall section 142 to protrude into the path of valve shaft 121 (or a respective hole/protrusion therein) to retain main valve 114 in a desired position.

Figure 4:
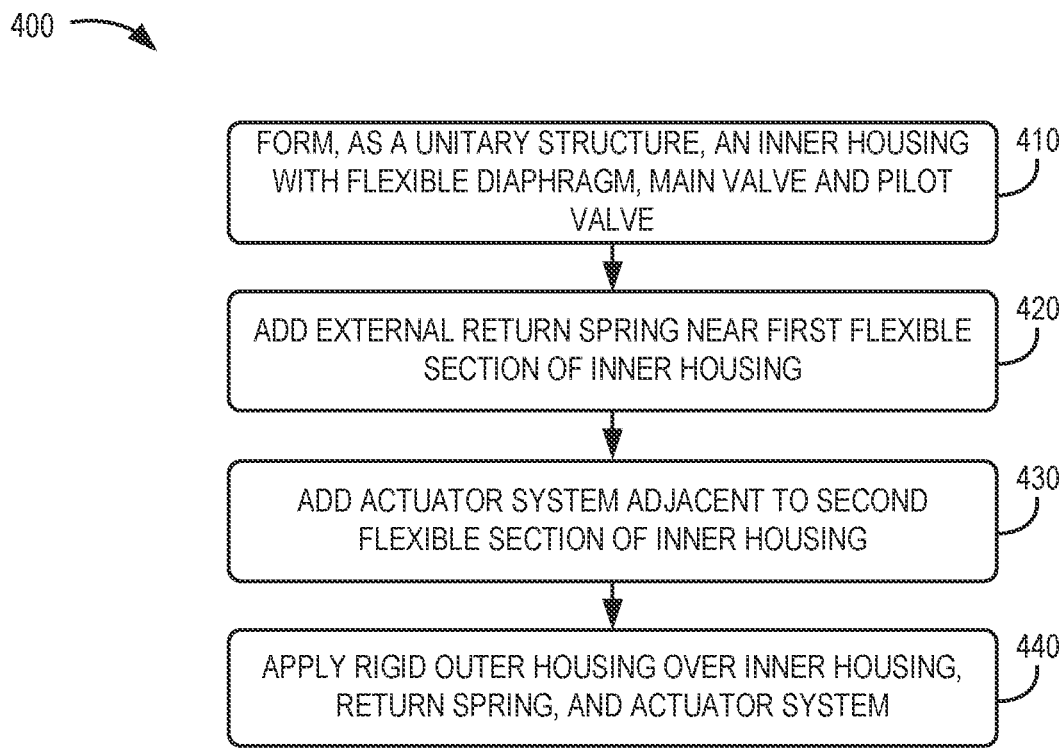
FIG. 4 is a flow diagram of an exemplary process for producing an oscillating diaphragm valve, according to an implementation described herein.

FIG. 4 is a flow diagram of an exemplary process for producing a diaphragm valve, according to an implementation described herein. Process 400 may include forming, as a unitary structure, an inner housing, a flexible diaphragm, a main valve, and a pilot valve (block 410). For example, an additive manufacturing process may be used to collectively form valve internals 125, as shown in FIG. 1B, including inner housing 102. According to one implementation, additive manufacturing may be performed using a 3D printer. For example, an elastomeric material for inner housing 102 may be extruded into a filament of a standard size (e.g., 1.75 mm or 3 mm diameter) designed to work with a fused filament fabrication (FFF)-based 3D printing platform. The filament may be fed into the 3D printing platform, which can be programmed to print a desired component shape, such as valve internals 125 of FIG. 1B. In one implementation, the 3D printing platform may execute instructions based on a computer aided drafting (CAD) model to print the desired component shape.

Process 400 may also include adding an external return spring near a first flexible wall section of the inner housing (block 420). For example, return spring 130 may be positioned outside of inner housing 102, between rocker portion 128 and outer housing 150, and adjacent to flexible wall section 132. The return spring 130 may be configured to exert a biasing force through rocker portion 128 directly or indirectly against diaphragm 104 to push main valve 114 toward a closed position.

Process 400 may further include adding an actuator system adjacent to a second flexible wall section of the inner housing (block 430). For example, actuator system 310 may be positioned outside of inner housing 102 and adjacent to flexible wall section 142. Actuator system 310 may be configured to selectively deform flexible wall section 142 and hold main valve 114 in an open or closed position.

Process 400 may additionally include applying a rigid outer housing over the inner housing, return spring, and actuator system (block 440). For example, outer housing 150 may be installed around inner housing 102. Outer housing 150 may be installed over inner housing 102 as a multi-piece component with return spring 130 and/or actuator system 310 positioned between inner housing 102 and outer housing 150.

While a series of blocks have been described with regard to FIG. 4, the order of the blocks may be modified in other embodiments. For example, in another implementation, some or all of the outer housing may be applied over the inner housing 102 before the return spring or actuator system is added. In still another implementation, process 400 may not require installation of a return spring or actuator system.

Figure 5A:
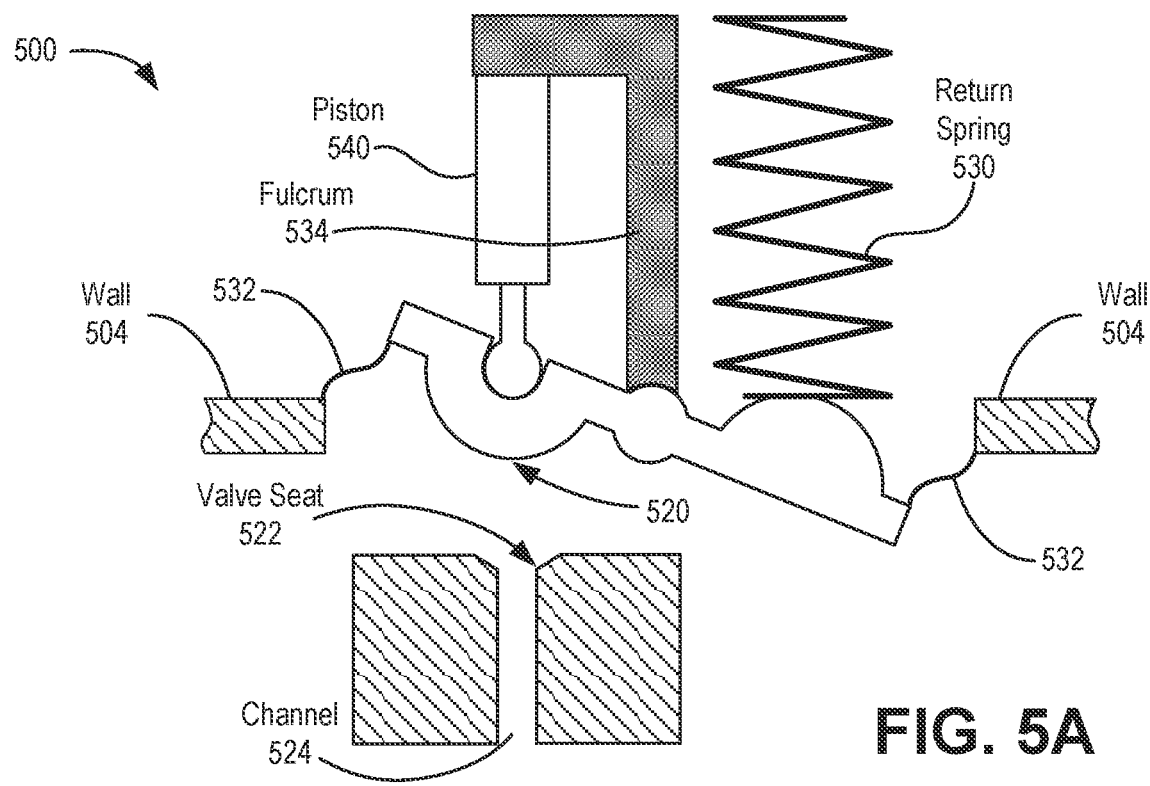
FIGS. 5A and 5B are schematic cross-sectional diagrams illustrating a rocker assembly for an additively-manufactured pilot-operated diaphragm valve.
Figure 5B:
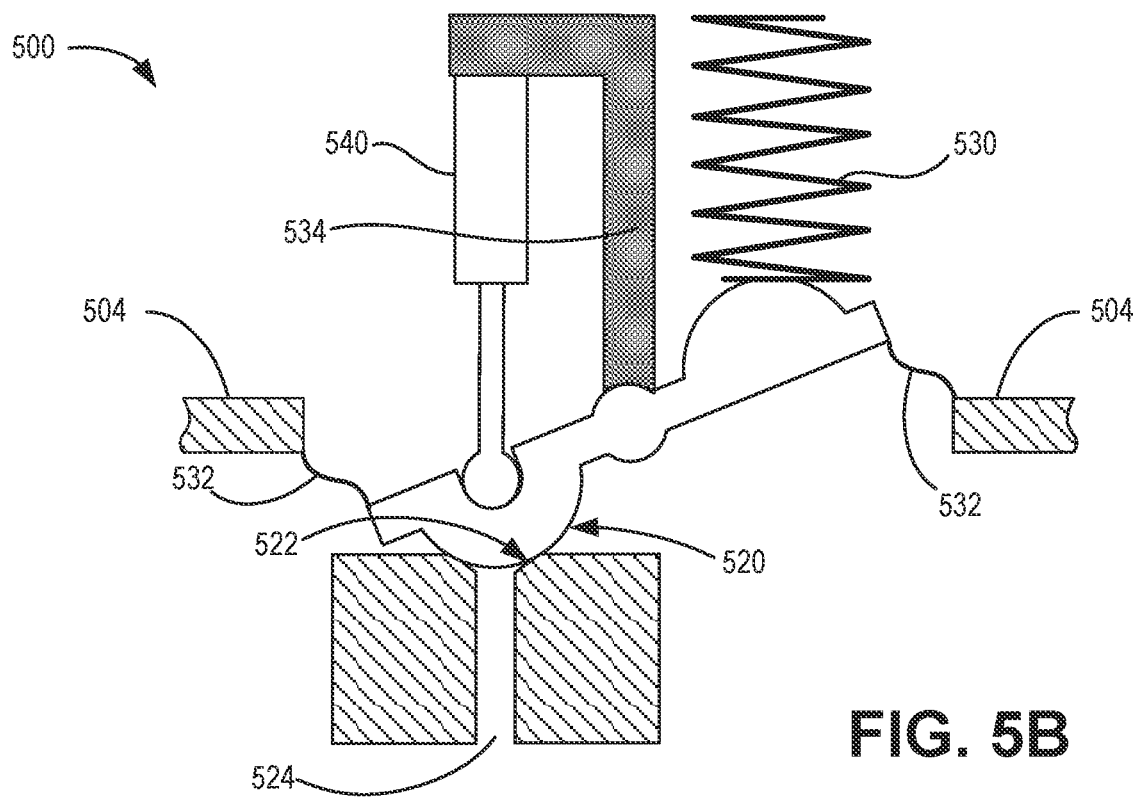

FIGS. 5A and 5B are schematic cross-sectional diagram illustrating a rocker assembly 500 for an additively-manufactured pilot-operated diaphragm valve. Rocker assembly 500 may include a rocker portion 528 (also referred to herein simply as rocker 528), a return spring 530, flexible wall section 532, a fulcrum 534, and a piston 540. Rocker 528 may be integral with a wall 504 of a housing and connected to wall 504 by flexible wall section 532. Rocker 528 may, for example, include a substantially oval or disc-shaped portion of wall 504 surrounded by flexible wall section 532 such that flexible wall section 532 forms a contiguous fluid-tight barrier between wall 504 and rocker 528.

Similar to the arrangement of biasing system 210 described above, return spring 530, piston 540, and fulcrum 534 may be supported by an external housing (not shown in FIGS. 5A and 5B). Also similar to the arrangement of biasing system 210, rocker 528 may pivot around fulcrum 534 to the extent permitted by flexible wall section 532. Piston 540 may engage an external surface of rocker 528 on one side of fulcrum 534 and return spring 530 may engage the external surface of rocker 528 on the opposite side of fulcrum 534.

Rocker 528 may incorporate a valve 520 which may intermittently engage with a valve seat 522 to block or permit flow through a channel 524. As shown in FIG. 5A, when piston 540 is in a retracted position, valve 520 is removed from valve seat 522, permitting fluid to flow into channel 524. As shown in FIG. 5B, when piston 540 extends, rocker 528 pivots to close valve 520 against valve seat 522 and compresses return spring 530. When piston 540 is released from the extended position, return spring 530 applies a biasing force to rocker 528, which may cause a valve 520 to return to an open position.

The arrangement of rocker assembly 500, as depicted in FIGS. 5A and 5B, may allow for opening of valve 520 in such a way as to maintain a consistent internal volume (or capacity) within a valve housing that is not affected by the motion of rocker 528. The consistent capacity may allow for maintaining pressure differentials that can be useful, for example, in low-powered activation of pilot valves.

A valve system described herein includes an inner housing defining an internal space. The inner housing including a supply orifice to receive fluid, a consumption orifice to expel fluid, and first flexible wall section. The valve system also includes a diaphragm dividing the internal space into a first volume and a second volume, with the supply orifice configured to supply fluid into the first volume. The valve system also includes a pilot channel connecting the second volume to the consumption orifice. The pilot channel includes a smaller inner diameter than a diameter of the supply orifice. A main valve is connected to the diaphragm. The diaphragm moves between a closed position, which causes the main valve to prevent fluid flow through the first volume from the supply orifice to the consumption orifice, and an open position, which causes the main valve to permit fluid flow through the first volume from the supply orifice to the consumption orifice. The valve system further includes a return spring, external to the inner housing. The return spring applies pressure to the first flexible wall section of the inner housing and provides a bias against expansion of the diaphragm into the second volume.

In some embodiments, the valve system may include an outer housing, external to the inner housing, wherein the inner housing provides a support structure to prevent distortion of walls of the inner housing by internal fluid pressure. The valve system may also include a pilot valve, connected to the diaphragm, that prevents fluid flow through the pilot channel when the diaphragm is in the open position and permits fluid flow through the pilot channel when the diaphragm is in the closed position. An actuator, external to the inner housing, applies a force to a second flexible wall section of the inner housing to selectively arrest the diaphragm in the closed position or in the open position.

A method for assembling a valve is also provided. The method includes forming, as a unitary structure, an inner housing with a flexible diaphragm, a main valve, and a pilot valve; adding an external return spring adjacent to a first flexible wall section of the inner housing; adding an actuator system adjacent to a second flexible wall section of the inner housing; and applying a rigid outer housing over the inner housing, return spring, and actuator system.

The foregoing description of implementations provides illustration and description, but is not intended to be exhaustive or to limit the invention to the precise form disclosed. Modifications and variations are possible in light of the above teachings or may be acquired from practice of the invention.

Use of ordinal terms such as "first," "second," "third," etc., in the claims to modify a claim element does not by itself connote any priority, precedence, or order of one claim element over another, the temporal order in which acts of a method are performed, the temporal order in which instructions are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the articles "a," "an," and "the" are intended to include one or more items. Further, the phrase "based on" is intended to mean "based, at least in part, on" unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

With reference to the use of the words "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A valve, comprising:
   an inner housing defining an internal space, the inner housing including a supply orifice to receive fluid, a consumption orifice to expel fluid, and a first flexible wall section;
   a diaphragm dividing the internal space into a first volume and a second volume, wherein the supply orifice is configured to supply fluid into the first volume;
   a pilot channel connecting the second volume to the consumption orifice, wherein the pilot channel includes a smaller inner diameter than a diameter of the supply orifice;
   a main valve connected to the diaphragm, wherein the diaphragm moves between a closed position, which causes the main valve to prevent fluid flow through the first volume from the supply orifice to the consumption orifice, and an open position, which causes the main valve to permit fluid flow through the first volume from the supply orifice to the consumption orifice; and
   a return spring, external to the inner housing, wherein the return spring applies pressure near the first flexible wall section of the inner housing to bias against expansion of the diaphragm into the second volume.

2. The valve of claim 1, further comprising:
   an outer housing, external to the inner housing, wherein the outer housing provides a support structure to prevent distortion of walls of the inner housing by internal pressure.

3. The valve of claim 1, further comprising:
   a pilot valve connected to the diaphragm,
   wherein the pilot valve prevents fluid flow through the pilot channel when the diaphragm is in the open position, and
   wherein the pilot valve permits fluid flow through the pilot channel when the diaphragm is in the closed position.

4. The valve of claim 3, further comprising:
   an actuator, external to the inner housing, wherein the actuator is configured to apply a force to a second flexible wall section of the inner housing to selectively arrest the diaphragm in the closed position or in the open position.

5. The valve of claim 4, further comprising:
   a shaft coupling the pilot valve to the diaphragm,
   wherein the actuator is configured to cause the second flexible wall section of the housing to engage a feature on one of the pilot valve or the shaft to prevent movement of the diaphragm.

6. The valve of claim 1, wherein the inner housing, the diaphragm, the pilot channel, and the main valve comprise a unitary structure formed using an additive manufacturing process.

7. The valve of claim 1, wherein, when the diaphragm is in the closed position and an output from the consumption orifice is open, fluid pressure in the first volume forces the diaphragm toward the open position, and
   wherein, when the diaphragm is in the open position and an input into the supply orifice is open, fluid pressure in the second volume forces the diaphragm toward the closed position.

8. The valve of claim 1, wherein the diaphragm comprises one or more bleed holes that permit fluid flow through the diaphragm.

9. The valve of claim 1, wherein the inner housing defines a substantially cylindrical internal space, and
   wherein the diaphragm is axially aligned with a valve seat for the main valve.

10. The valve of claim 1, wherein the inner housing and the diaphragm are formed with a same material.

11. The valve of claim 1, further comprising a rocker portion adjacent the first flexible wall section, wherein the rocker portion pivots between an open position and a closed position while maintaining a consistent capacity of the first volume and the second volume.

12. A method comprising:
    forming, as a unitary structure, valve internals including:
      an inner housing that has a first flexible wall section,
      a flexible diaphragm,
      a main valve, and
      a pilot valve;
    adding a return spring adjacent to the first flexible wall section of the inner housing and outside the inner housing;
    adding an actuator system adjacent to a second flexible wall section of the inner housing and outside the inner housing; and
    applying a rigid outer housing over the inner housing, the return spring, and the actuator system.

13. The method of claim 12, wherein forming the valve internals comprises:
    forming the valve internals, using a fused filament fabrication (FFF)-based printing platform.

14. The method of claim 12, wherein the inner housing and the flexible diaphragm are formed from a same material.

15. The method of claim 12, wherein the inner housing and the flexible diaphragm are formed from different materials.

16. The method of claim 12, wherein the inner housing defines an internal space, and
    wherein the diaphragm divides the internal space into a first volume and a second volume.

17. The method of claim 12, wherein the inner housing comprises an elastomeric material and wherein the outer housing comprises a rigid material.

18. The method of claim 12, wherein the return spring is configured to exert a biasing force through the first flexible wall section against the diaphragm.

19. The method of claim 12, wherein the actuator system is configured to selectively exert a force to deform the second flexible wall section and hold the diaphragm in one of an open or closed position.

20. The method of claim 12, wherein forming the diaphragm includes forming the diaphragm with one or more bleed holes that permit fluid flow through the diaphragm.

* * * * *